United States Patent [19]

Noonan et al.

[11] Patent Number: 5,531,276
[45] Date of Patent: Jul. 2, 1996

[54] FLIP-UP C-SHANK STANDARD FOR A CULTIVATOR

[75] Inventors: James T. Noonan, Johnston; Warren L. Thompson, Elkhart, both of Iowa

[73] Assignee: Deere & Company, Moline, Ill.

[21] Appl. No.: 402,271

[22] Filed: Mar. 10, 1995

[51] Int. Cl.⁶ ............................ A01B 23/02; A01B 35/20
[52] U.S. Cl. .......................... 172/662; 172/763; 172/740
[58] Field of Search .................................. 172/662, 763, 172/734, 739, 740, 744, 748; 403/83, 84, 103, 104

[56] References Cited

U.S. PATENT DOCUMENTS

| | | | |
|---|---|---|---|
| 1,042,674 | 10/1912 | Helmbacher | 172/744 |
| 3,010,744 | 11/1961 | Hollis | 172/763 |
| 3,480,086 | 11/1969 | Groenke | 172/734 |
| 3,981,367 | 9/1976 | Mydels | 172/265 |
| 4,079,790 | 3/1976 | Guttler | 172/643 |
| 4,177,865 | 12/1979 | Lewison | 172/705 |
| 4,700,785 | 10/1987 | Bartusek | 172/705 |
| 4,991,661 | 2/1991 | Barenthsen | 172/662 |
| 5,040,616 | 8/1991 | Hake | 172/271 |
| 5,050,685 | 9/1991 | Harrison | 172/739 |
| 5,255,617 | 10/1993 | Williams et al. | 172/740 |
| 5,361,848 | 11/1994 | Fleischer et al. | 172/140 |
| 5,409,068 | 4/1995 | Hake et al. | 172/740 |

FOREIGN PATENT DOCUMENTS 437136  11/1926  Germany .................................. 172/734

*Primary Examiner*—Spencer K. Warnick, IV

[57] ABSTRACT

A simple, light-weight C-shank standard is mounted on a bracket which is corner clamped to a rig cross tube on a row crop cultivator. A pin inserted through apertures in the bracket maintains the shank in a preselected field-working attitude. The pin can be removed to allow the shank to be pivoted upwardly for maintenance, sweep removal, or residue removal. The shank can be supported in the raised position by the pin when the cultivator configuration is changed for cultivation in lay-by conditions, or for operation in skip row or other special crop configurations. In one embodiment of the invention, the shank is edgebent and selective placement of the pin through one of a plurality of sets of mating holes in the bracket and the upper portion of the shank permits adjustment of the working position of the shank. A mounting slot at the lower end of the one embodiment of the shank provides pitch adjustment for the earth-working tool.

16 Claims, 2 Drawing Sheets

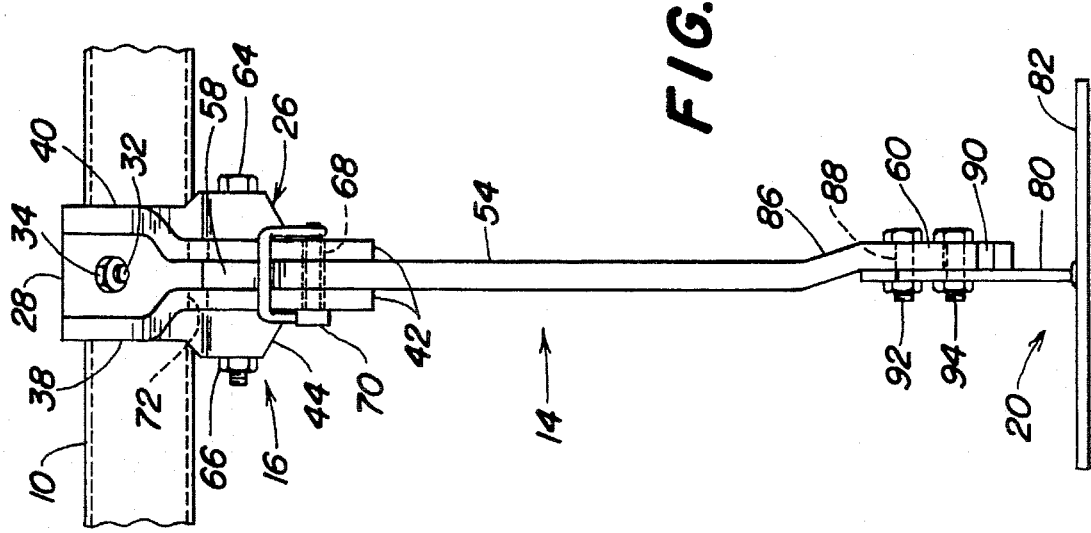
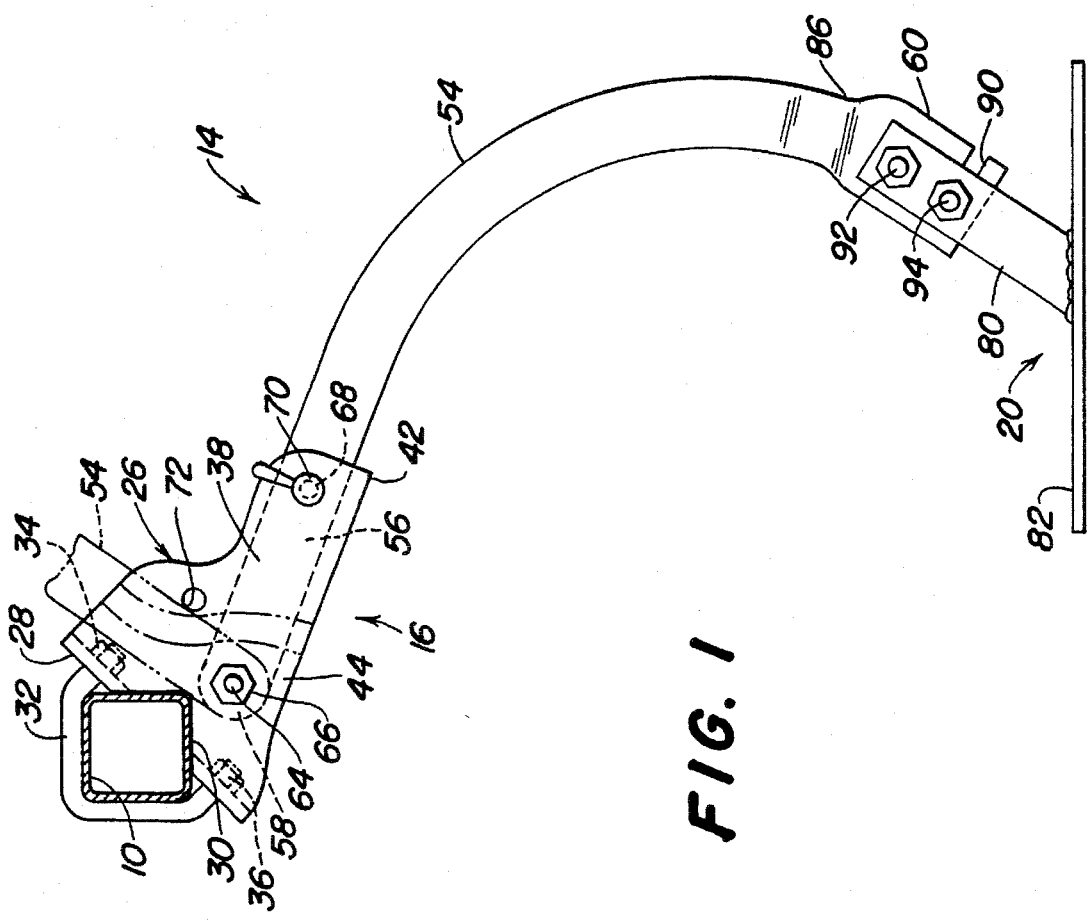

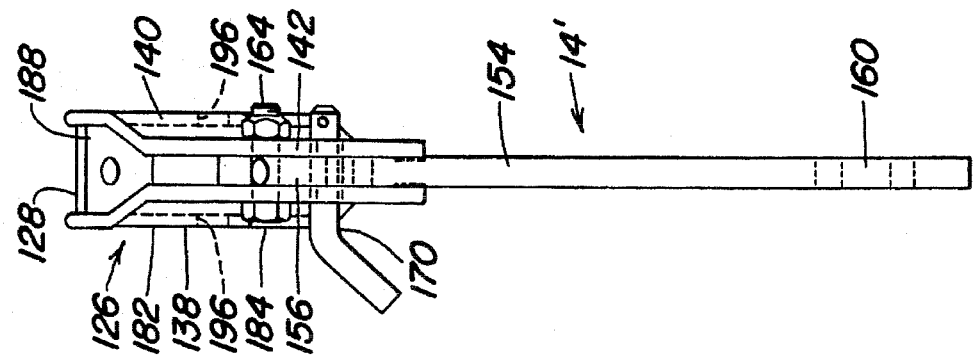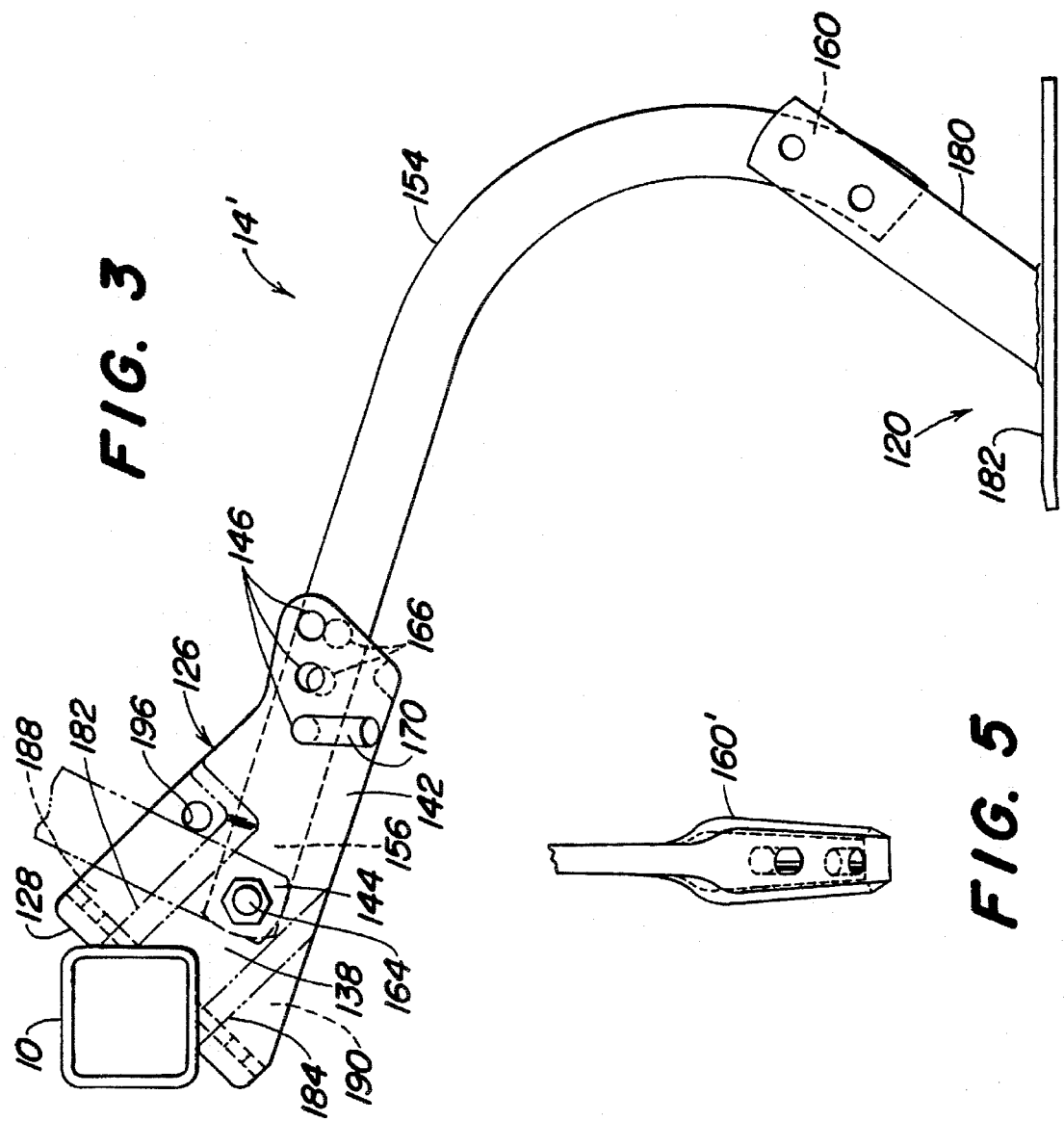

FLIP-UP C-SHANK STANDARD FOR A CULTIVATOR

BACKGROUND OF THE INVENTION

1) Field of the Invention

The present invention relates generally to cultivators, and, more specifically, to shank structure for row crop cultivators or the like.

2) Related Art

Row crop cultivators often include spring trip standards for cultivating in conditions where obstacles are likely to be encountered. For minimum obstruction conditions, a lower cost and lighter weight alternative to the spring trip standards is preferred.

During the initial cultivation, several standards are usually provided between the rows of crop. However, for later high speed lay-by of the crop, the number of standards is typically reduced and sometimes only a single standard is required between each pair of rows. The number of standards may also need to be varied to accommodate cultivation of special crops, such as sugar beets, or to handle skip-row crops. Changeover from one number of standards to a smaller number requires removal of standards or rotation of the standards upwardly. Removal of standards, and the later reattachment of the standards, are time-consuming and inconvenient tasks.

Removal and replacement of the sweeps or maintenance of the sweeps while on the standard is difficult as a result of the sweeps normally being quite low to the ground and the attaching bolts being at an awkward angle. Clearing blockages caused by build-up of residue also presents problems because of the relatively inaccessible position of the shank and sweep. A typical low-cost shank assembly often lacks an acceptable shank attitude adjustment and/or sweep pitch adjustment. Some light-weight assemblies, such as those utilizing S-tine shanks, may in some field conditions provide inadequate support for consistent sweep action. Lateral stability often is severely compromised with low cost and light-weight assemblies.

Flat profile sweeps, used primarily for cultivating cotton and peanut crops so only a small amount of soil is disturbed, are typically connected to the rig with rigid, upright shanks. Such shanks usually have poor residue flow and soil disturbance characteristics.

BRIEF SUMMARY OF THE INVENTION

It is therefore an object of the present invention to provide an improved shank structure which overcomes most or all of the aforementioned problems. It is a further object to provide such an improved shank structure which is simple, low in cost, and light in weight. It is still a further object to provide such a structure which has sturdy sweep support and good lateral stability.

It is another object of the present invention to provide an improved shank structure which can be easily cleared of residue build-up. It is yet another object to provide such a structure which provides easier sweep removal and cultivator rig maintenance than at least most previously available shank structures.

It is still a further object of the present invention to provide an improved shank structure which permits rapid changeover from one number of shanks to another.

It is also an object of the invention to provide such a shank structure which provides good residue flow.

It is still another object of the present invention to provide an improved shank structure which is particularly useful when cultivating peanut or cotton crop. It is a further object to provide such a structure which has a narrow profile and which easily accommodates sweeps with flat profiles to reduce soil movement. It is a further object to provide an improved shank structure which facilitates simple shank attitude adjustments.

A simple, light-weight and low cost rigid C-shank standard constructed in accordance with the teachings of the present invention is mounted on a bracket which is corner clamped to a rig cross tube on a row crop cultivator. A pin in the bracket maintains the shank in a preselected field-working attitude and is removable to permit the shank to be pivoted upwardly for maintenance, sweep removal, or residue removal. The shank can be supported in the raised position by the pin, for example, when the cultivator configuration is changed for cultivation in lay-by conditions, or for operation in skip row or other special crop configurations.

In one embodiment of the invention, the C-shank is edgebent, and sets of mating holes in a narrow portion of the bracket behind the pivotal area and in the narrow upper portion of the shank permit adjustment of the working position of the shank by selective placement of the pin in one of the sets. The narrow portion of the bracket enhances lateral stability of the shank, and a transversely extending stop stiffens the bracket and prevents substantial downward rotation of the shank beyond the lowermost adjusted position when the pin is removed. A mounting slot at the lower end of the edgebent C-shank readily accepts a flat profile sweep and provides pitch adjustment and breakaway protection for the sweep. The C-shape and narrow profile of the standard provides better residue flow and less soil disturbance than available vertical shaft standards.

These and other objects, features and advantages of the present invention will become apparent to one skilled in the art upon reading the following detailed description in view of the drawings.

BRIEF DESCRIPTION OF THE DRAWINGS

FIG. 1 is a side view of an edgebent flip-up C-shank structure having a widened pivot portion.

FIG. 2 is a rear view of the shank structure of FIG. 1.

FIG. 3 is a view similar to FIG. 1 but showing an edgebent C-shank structure having a generally constant profile.

FIG. 4 is a rear view of the shank structure of FIG. 3.

FIG. 5 is a rear view of the lower tool-receiving portion of an edge bent shank having a mounting for a knock-on sweep.

DETAILED DESCRIPTION OF THE DRAWINGS

Referring now to FIG. 1, therein is shown a transversely extending cultivator rig cross tube 10 supported from the frame of a row crop cultivator (not shown) or the like adapted for forward movement over the ground between transversely spaced rows of crops. Rigid C-shank structure shown generally at 14 is connected by a clamp arrangement 16 to the cross tube 10 and supports an earthworking tool 20 adapted to cultivate the soil between parallel rows of crop. The number of C-shank structures 14 supported between adjacent rows depends on crop conditions, but typically the number varies from one to three.

As shown in FIGS. 1 and 2, the clamp arrangement 16 includes a mounting bracket 26 having an angled corner clamping wall 28 which is notched at 30 to contact the lower and aft faces of the cross tube 10. A U-bolt 32 extends around the top and forward faces of the tube 10 and through apertures in the wall 28. Nuts 34 and 36 are threaded onto the ends of the U-bolt 32 and against the rear of the wall 28 to firmly secure the bracket 26 to the tube 10. The wall 28 is relatively wide to provide stable clamp support relative to the tube 10. Side walls 38 and 40, which extend rearwardly from the face 28, converge in the rearward direction to define a narrow, upright shank-engaging portion 42 extending rearwardly of and below the tube 10. A widened pivot area 44 is defined adjacent the lower aft corner of the tube 10.

The shank structure 14 includes a C-shaped edge-bent shank 54 having a top portion 56 with an enlarged journal area 58 pivotally connected to the widened pivot area 44 of the mounting bracket 26. The shank 54 extends downwardly and forwardly to a lower tool-receiving end 60. A pivot bolt 64 extends through holes in the side walls 38 and 40 and through a hole in the journal area 58, and a nut 66 is threaded onto the end of the bolt. The shank 54 pivots about the axis of the bolt 64 between a field-working position (solid lines of FIG. 1) and a storage position (broken lines of FIG. 1). A portion of the edgebent shank 54 immediately rearward of the pivot area 44 is embraced by the shank-engaging portion 42 for lateral stability. The length of the portion of the shank which is embraced rearwardly of the pivotal connection is substantial compared to the length of the shank and is preferably at least approximately 25 percent of the fore-and-aft dimension of the shank in the field-working position.

The aft end of the shank-engaging portion 42 is apertured at location 68, and a corresponding aperture in the shank 54 aligns with the aperture at 68 for receiving pin structure 70 which releasably retains the shank in the field-working position. When the pin structure 70 is removed from the aperture at 68 and the aperture in the shank 54, the shank can be rotated upwardly to the storage position (broken lines of FIG. 1). A second aperture 72 in the bracket 26 is located rearwardly and above the pivot 64 for receiving the pin structure 70 which contacts the lower edge of the upwardly rotated shank 54 to prevent the shank from rotating back towards the field-working position. In the storage position, the lower end 60 of the shank 54 is located above the level of the pivot area 44 for easy access to the tool 20.

As shown in FIGS. 1 and 2, the tool 20 is a low soil disturbance sweep, commonly known as a Smith fin sweep. An apertured attaching portion 80 projects upwardly and rearwardly from a generally flat V-shaped portion 82. The shank 54 is transversely offset at location 86, and the tool-receiving end 60 includes an aperture 88 and a slot 90 which align with corresponding apertures in the attaching portion 80. Bolts 92 and 94 extend though the apertures and slot 90 to releasably secure the tool 20 to the inside portion (FIG. 2) of the offset end 60. The slot 90 as shown extends through to the rear edge of the shank and provides tool pitch adjustment as well as break-away protection for the tool if an obstacle is encountered. The tool 20 can also be removed by loosening the bolt 94 and removing the bolt 92.

In the preferred embodiment shown in FIGS. 3 and 4, a mounting bracket 126 includes an angled corner clamping wall 128 connected to the tube 10 by a U-bolt and nuts (not shown) in similar fashion as that described above for the bracket 26 of FIGS. 1 and 2. Side walls 138 and 140 extend rearwardly from the face 128 to a narrow, shank-engaging portion 142 which is elongated in the rearward and downward direction and which includes a forward, apertured shank pivot area 144 rearwardly and below the lower rear corner of the tube 10. The portion 142 also includes sets of rear apertures 146 for shank attitude adjustment, described in detail below.

Shank structure 14' includes a C-shank 154 having an upper portion 156 embraced by the walls of the shank-engaging portion 142. The forwardmost extremity of the shank portion 156 is apertured and pivotally connected by a bolt 164 to the pivot area 144 for rocking between a field-working position (solid lines of FIGS. 3 and 4) and an upper storage or maintenance position (broken lines of FIG. 3). The shank 154 extends rearwardly out from between the aft ends of the side walls 138 and 140 and curves downwardly and forwardly to a tool-receiving end 160. Apertures 166 in the shank upper portion 156 are located at varying radii from the pivotal axis of the shank 154 so that each aperture aligns with one of the sets of rear apertures 146. Alignment of the apertures 146 and 166 occur at different angular relationships between the shank and the bracket 126, and a pin structure 170 is inserted through a selected set of the apertures depending on the desired attitude of the shank.

The bracket 126 diverges outwardly in the forward direction at upper and lower locations 182 and 184 to provide a relatively wide contact area at the forward wall 128 for mounting stability on the tube 10. The diverging locations provide wrench access at locations 188 and 190 for turning the securing nuts on the threaded ends of the U-bolt (see 32 of FIGS. 1 and 2). Preferably, the bracket 126 is a unitary casting having a transversely extending stop member 174 which stiffens the bracket and limits downward rocking of the shank 154 beyond a position just below the lowermost adjusted position.

The side walls 138 and 140 of the bracket 126 are apertured at locations 196 to receive the pin structure 170 to retain the shank in the upwardly rotated storage position for clearing a blockage, performing tool maintenance or replacement, or reducing the number of tools operating between row crops. In the storage position, the tool-receiving end 160 is higher than the tube 10 to provide convenient access. Various tools including a Smith fin sweep 120 may be attached to the end 160. If desired for accommodating a conventional knock-on sweep, forged tool-receiving ends 160' (FIG. 5) may be utilized which are tapered to receive a mating tapered portion on the sweep.

To adjust the position of the shank 154 relative to the bracket 126, the pin structure 170 is removed from the bracket 126 and the shank 154 is pivoted until there is alignment of the apertures 146 and 166 at the desired shank attitude. The pin structure 170 is then inserted through the aligned apertures to secure the shank 154 in the adjusted position. The stop member 174 assures that the shank 154 has only to be pivoted a short distance upwardly to an adjusted working position. An upper mounting aperture 200, which is elongated in the fore-and-aft direction, provides infinite pitch adjustment for the sweep 120 in the range of shank attitude adjustments provided by the apertures 146 and 166. Therefore sweep pitch adjustment can be made easily for good sweep penetration and opitimum soil flow.

Having described the preferred embodiment, it will become apparent that various modifications can be made without departing from the scope of the invention as defined in the accompanying claims.

We claim:

1. Cultivator shank structure for mounting on a tube, the shank structure adapted for forward movement over the ground and comprising;

a mounting bracket;

a C-shaped shank having a top portion pivotally connected to the mounting bracket for rocking about a transverse axis, the shank also including a lower tool receiving end;

the mounting bracket including a mounting portion for mating with the tube and sides generally embracing the top portion of the shank; and releasable pin structure connected to the mounting bracket for selectively maintaining the shank in a preselected pivotal position corresponding to a working position of the shank, the pin structure when released facilitating upward pivoting of the shank about the transverse axis to a storage position wherein the lower tool receiving end is offset above the transverse axis; and wherein the shank is edgebent to provide a narrow profile to soil while the shank is moved forwardly through the soil, and the top portion of the shank includes a widened pivot area, the mounting bracket including a forward mounting portion pivotally supporting the widened pivot area and a narrowed shank embracing portion rearwardly of the pivot area for receiving an edgebent portion of the shank and providing transverse stability to the shank.

2. The invention as set forth in claim 1 wherein the narrowed shank embracing portion is apertured to receive the pin structure.

3. The invention as set forth in claim 1 wherein the shank embracing portion and the edgebent portion of the shank received by the shank embracing portion include a plurality of mating apertures for selectively receiving the pin structure to thereby adjust the working position of the shank.

4. The invention as set forth in claim 3 wherein the tool receiving end of the shank includes a narrow profile and has forward and a rearward edges, and a generally fore-and-aft extending slot extending through to the rearward edge, an earthworking tool, and bolt structure extending through the slot and securing the tool to the tool receiving end, wherein the slot provides tool pitch adjustment and breakaway protection for the tool.

5. Cultivator shank structure for mounting on a tube, the shank structure adapted for forward movement over the ground and comprising:

a mounting bracket having sides with a forward connecting portion adapted for mounting on the tube and a rearward portion, wherein the sides diverge inwardly from the forward connecting portion to the rearward portion;

a rigid shank having a lower tool receiving end and an upper portion of preselected width pivotally connected to the forward connecting portion of the mounting bracket for rocking between the sides about a transverse axis, the upper portion of the shank having a narrow profile and embraced by the inwardly diverging sides to provide lateral stability; and means connected to the mounting bracket for selectively maintaining the shank in one of at least two preselected pivotal positions, the first position corresponding to a working position of the shank and the second position corresponding to a storage position of the shank.

6. The invention as set forth in claim 5 wherein the shank and the inwardly diverging sides include selectively alignable holes, and further including selectively releasable pin structure receivable by aligned holes to maintain the shank in a preselected working attitude corresponding to the working position of the shank.

7. The invention as set forth in claim 6 wherein the pin structure when released facilitates upward pivoting of the shank about the transverse axis to a storage position.

8. The invention as set forth in claim 6 wherein the shank and the inwardly diverging sides include a plurality of sets of the selectively alignable holes, and wherein the working attitude of the shank in the working position is adjustable by insertion of the pin structure into different sets of the holes.

9. The invention as set forth in claim 8 wherein the shank is edgebent substantially from the upper portion to the tool receiving end.

10. The invention as set forth in claim 9 including a pitch adjusting slot extending in the fore-and-aft direction at the lower end of the shank.

11. The invention as set forth in claim 6 including means for receiving the pin structure to maintain the shank in the storage position.

12. The invention as set forth in claim 5 wherein the tool receiving end of the shank, when the shank is in the storage position, is above the transverse axis.

13. The invention as set forth in claim 5 wherein the shank is C-shaped opening in the forward direction.

14. The invention as set forth in claim 5 wherein a substantial portion of the shank rearwardly of the pivotal connection with the mounting bracket is embraced by the inwardly diverging sides when the shank is in the working position.

15. The invention as set forth in claim 14 wherein the length of said substantial portion of the shank which is embraced rearwardly of the pivotal connection is at least approximately 25 percent of the fore-and-aft dimension of the shank in the field-working position.

16. The invention as set forth in claim 6 wherein the mounting bracket comprises a unitary casting having a transversely extending stop for preventing substantial rocking of the shank downwardly from the working position when the pin structure is removed.

\* \* \* \* \*